United States Patent Office 3,703,485
Patented Nov. 21, 1972

3,703,485
PROCESS FOR PRODUCING VINYL RESIN FOAMS
Nicolas Fischer, Paris, France, assignor to
Rhone-Progil, Paris, France
No Drawing. Continuation of abandoned application Ser.
No. 699,297, Jan. 22, 1968. This application Dec. 21,
1970, Ser. No. 100,538
Claims priority, application France, Feb. 6, 1967,
93,856
Int. Cl. C08f 47/08
U.S. Cl. 260—2.5 P       12 Claims

ABSTRACT OF THE DISCLOSURE

The process for the preparation of cellular foamed products of polyvinyl resin plastisols in which the plastisol is formulated to contain an alkali metal alkylsulphate as an essential component in an amount within the range of 1–15 parts by weight per 100 parts by weight of resin or an alkali metal alkylsulphate and alkanolamine alkylsulphate and preferably the combination of an alkali metal alkylsulphate, an alkanolamine alkylsulphate, an alkylene oxide-alcohol or phenol condensation product and an alkanolamide in the ratio of 1–15 parts by weight of the alkali metal alkylsulphate, 1–10 parts by weight of the alkanolamine alkylsulphate, 0.5–4 parts by weight of the condensation product and 0.1–4 parts by weight of the alkanolamide per 100 parts by weight of resin, after which the mixture is foamed by agitation and heated to set the foamed plastisol.

This application is a continuation of Ser. No. 699,297, filed Jan. 22, 1968, now abandoned.

This invention relates to foams of polyvinyl resin and the compositions and methods for preparation of same.

Polyvinyl chloride sponge or foamed products having connected (open) or disconnected (closed) cells are produced from plastisols by the processes of expansion or foaming the plastisol and heating to gel and to flux the expanded or foamed system. Three techniques have been developed to produce the foamed system. In one method, use is made of a compressed gas, such as carbon anhydride, carbon dioxide or nitrogen, dissolved under pressure in the plastisol. When the pressure is released, the dissolved gases expand in the plastisol to provide a foamed plastisol having closed cells. In a second method, use is made of chemical blowing or gas generating agents which are decomposed in the plastisol to release a gas, such as nitrogen, to form the plastisol into a foam or sponge. In the third method, use is made of mechanical action to beat the plastisol to form a foam or froth by the incorporation of a multiplicity of air bubbles therein.

The system which makes use of compressed gases requires the use of relatively expensive bottled gases, expensive refrigeration equipment for precise low temperature control, and complicated machinery for operation at high pressure. The process which makes use of chemical blowing agents is expensive by reason of the high cost of the chemical agents and the process is difficult to control. The present system for making use of foaming or frothing by beating air into the plastisol is unsatisfactory from a commercial standpoint, especially with plastisols of low density because the air bubbles tend to collapse before or during heating.

A further process has been proposed wherein use is made of mechanical beating or agitation of the plastisol in the presence of an alkali metal soap and water to form a foam having a fine uniform cellular structure. However, satisfactory results are not consistently obtainable and the use of the required large quantities of emulsifying agent, in the form of a fatty acid soap, is characterized by a sweating out of the soap in a manner to cause the industry to have very little interest in this process.

It is an object of this invention to provide a composition and process for the production of foamed polyvinyl resinous products in which the process is not subject to the objectionable characteristics of the processes and compositions of the types described and it is a related object to provide a method and composition for producing foamed polyvinyl resin products in which a stable product is produced in a simple and efficient manner with uniform distribution of fine cells of the open or closed types.

In accordance with the practice of this invention the foamed product is produced of a plastisol formulated of the vinyl type resin with an emulsifying agent in the form of an alkali metal alkylsulphate.

In accordance with a further practice of this invention, use is made of a plastisol of polyvinyl resin formulated to contain a mixture of alkali metal alkylsulphate and an alkanolamine alkylsulphate.

In a preferred practice of the invention, the polyvinyl plastisol is formulated to contain an emulsifying system formed of a mixture of an alkali metal alkylsulphate, an alkanolamine alkylsulphate, an alkylene oxide-alcohol or phenol condensation reaction product and an alkanolamide, such as an amide obtained from an amino alcohol reaction with a fatty acid.

In one embodiment of the invention, use is made of a plastisol containing per 100 parts by weight of polyvinyl resin, 40–120 parts by weight of a plasticizer, 1–15 parts by weight alkali metal alkylsulphate and 1–10 parts by weight alkanolamine alkylsulphate. In the preferred embodiment of the invention, the plastisol is formulated, per 100 parts by weight of polyvinyl resin, of 40–120 parts by weight plasticizer, 1–15 parts by weight alkali metal alkylsulphate, 1–10 parts by weight alkanolamine alkylsulphate, 0.5–4 parts by weight of the alkylene oxide-alcohol or phenol condensation product, and 0.1–4 parts by weight alkanolamide.

As the alkali metal alkylsulphate, use can be made of a compound in which the alkali metal component is represented by sodium, potassium or ammonium and in which the alkyl group is one having from 10–18 carbon atoms such as decyl, dodecyl, octadecyl and the like.

The component identified as the alkanolamine alkylsulphate has reference to a compound in which the alkyl group is of the type previously described for the alkali metal alkylsulphate having from 10–18 carbon atoms and the component referred to as alkanolamine is represented by an amino alcohol group having from 2–6 carbon atoms, such as ethanolamine, propanolamine, isopropanolamine, butanolamine, isopropanoldiamine and the like.

As the condensation reaction product, use can be made of the condensation reaction product of an alkylene oxide, such as ethylene oxide or propylene oxide, with an alcohol having from 8–18 carbon atoms, such as lauric alcohol, octadecanol, dodecanol, stearyl alcohol and the like, or phenols including alkylphenols and the like having from 2–30 carbon atoms. The compound is formed with polyoxyalkylene chains having from 3–30 alkylene oxide units and preferably 4–16 alkylene oxide units in which the alkylene oxides are of the type having from 2–20 carbon atoms such as ethylene oxide, propylene oxide and the like. The polyoxyalkylene chain can be composed of the same or of different units.

When use is made of an alkanolamide, as in the preferred practice of the invention, the alkanolamide may be selected of the amides formed by the reaction of a fatty acid having from 10–18 carbon atoms, such as lauric acid, stearic acid, oleic acid and the like, with alkanolamines or multi-alkanolamines having from 2–4 carbon atoms in the alkanol group, such as ethanolamine, diethanolamine and the like.

In the following examples, which are given by way of illustration, but not by way of limitation, of the practice of this invention, the amounts of ingredients are in parts by weight.

EXAMPLE 1

A plastisol, having the following composition, is prepared:

| | Parts |
|---|---|
| Polyvinyl chloride | 100 |
| Dioctyl phthalate | 40 |
| Butylbenzyl phthalate | 35 |
| Epoxidized soya-bean oil stabilizer | 5 |

The ingredients are mixed in a kneader of the Werner type for 20 minutes. A paste is then added, composed of:

5 parts of sodium laurylsulphate
10 parts of butylbenzyl phthalate

Mixing is continued under vacuum for 20 minutes.

The plastisol thus prepared is mechanically beaten, as by means of an industrial high speed mixer or mill, such as marketed in France under the trade name "Dan Mixer."

The obtained foam is spread as a layer on a strip of silicone paper. Gelation is carried out by heating in a tunnel furnace at a temperature of 160° C. The tunnel is 6 m. long and the spreading velocity or rate of travel of the strip through the tunnel is 1 m./minute.

A vinyl foamed product is obtained having an apparent volumetric mass of 0.35 g./cm.$^3$ and in which the open type cells are uniformly distributed.

EXAMPLE 2

A plastisol, having the following composition, is prepared:

| | Parts |
|---|---|
| Polyvinyl chloride for pastes | 100 |
| Sodium laurylsulphate | 5 |
| Dioctyl phthalate | 40 |
| Butylbenzyl phthalate | 35 |
| Epoxidized soya-bean oil stabilizer | 5 |

The plastisol is processed as in Example 1 and a foamed product is obtained showing the same characteristics.

EXAMPLE 3

A plastisol is prepared of the following ingredients:

| | Parts |
|---|---|
| Polyvinyl chloride for pastes | 100 |
| Dioctyl phthalate | 40 |
| Butylbenzyl phthalate | 35 |
| Epoxidized soya-bean oil stabilizer | 5 |

As in the preceding examples, the ingredients are mixed in a Werner type mixer for 30 minutes. Addition is then made of a mixture composed of:

3 parts of sodium laurylsulphate
4 parts of an aqueous solution of isopropanolamine alkylsulphate (62.5% solids)
2 parts of oxyethylenated lauryl alcohol
0.5 part of alkanolamide derived by reaction of lauryl acid with diethanolamine
10 parts of butylbenzyl phthalate The materials are kneaded for 20 minutes under vacuum.

The plastisol is mechanically beaten or milled, as by means of a Dan Mixer, and the resulting foamed plastisol is spread as a layer on a strip of silicone paper. Gelation is carried out by heating in a tunnel furnace at 160° C. As in the preceding examples, the length of the tunnel is 6 m. and the strip speed is 1 m./minute.

Under these conditions, a foamed product is obtained having an apparent volumetric mass of 0.3 g./cm.$^3$. The product has very fine regular open cells while the foamed product has a mat surface, a regular appearance and a soft hand.

The process of this invention permits the preparation of a foamed product having regular, fine cells and an apparent low volumetric mass within the range of 0.2 to 0.4 g./cm.$^3$.

The process of this invention provides the following advantages and improvements over processes heretofore employed—a simple and easy process, a product containing fine cells, a product containing regular cells, and a product having apparent low volumetric mass.

The characteristics of the products obtained permit their use not only in conventional applications but for many other uses.

It will be understood that modifications may be made in the formulation and in the methods of processing without departing from the spirit of the invention, especially as defined in the following claims.

I claim:

1. In the process for the preparation of foamed products of plastisols of vinyl chloride polymer or copolymer resins, the steps of incorporating into the plastisol an emulsifier consisting essentially of 1–15 parts by weight of an alkylsulphate salt of a cation selected from the group consisting of alkali metal cations and ammonium cations and 1–10 parts by weight of an alkanolamine alkylsulphate per 100 parts by weight of vinyl chloride resin, the alkyl groups in the alkylsulphate salt and the alkanolamine alkylsulphate containing 10–18 carbon atoms, agitating the mixture to form a foamed mixture and then heating the foamed mixture to set the foamed product.

2. The process as claimed in claim 1 in which the alkylsulphate salt is selected from the group consisting of sodium, potassium and ammonium alkyl sulfates.

3. The process as claimed in claim 1 in which the alkanol group of the alkanolamine alkylsulphate is a $C_2$–$C_6$ alkanol with from 1–3 alkanol groups per amine group.

4. In the process for the preparation of foamed products of plastisols of vinyl chloride polymer or copolymer resins, the steps of incorporating into the plastisol an emulsifying mixture consisting essentially of 1–15 parts by weight of an alkylsulphate salt of a cation selected from the group consisting of alkyl metal cations and ammonium cations, and 1–10 parts by weight of an alkanolamine alkylsulphate, the alkyl groups of the alkylsulphate and the alkanolamine alkylsulphate containing 10–18 carbon atoms, 0.5–4 parts by weight of a compound selected from the group consisting of an alkylene oxide-alcohol condensation product and an alkylene oxide-phenol condensation product and 0.1–4 parts by weight of an alkanol amide per 100 parts by weight of the vinyl chloride resin, agitating the mixture to form a foamed mixture and heating the foamed mixture to set the foamed product.

5. The process as claimed in claim 4 in which the alkylsulphate salt is selected from the group consisting of sodium, potassium and ammonium alkylsulphates.

6. The process as claimed in claim 4 in which the alkanol group of the alkanolamine alkylsulphate has from 2–6 carbon atoms.

7. The process as claimed in claim 4 in which the alkylene oxide-alcohol or phenol condensation product is formed of an alkylene oxide having from 2–20 carbon atoms.

8. The process as claimed in claim 4 in which the alkylene oxide-alcohol or phenol condensation product is formed of an alkylene oxide selected from the group consisting of ethylene oxide and propylene oxide and an alcohol selected from the group consisting of an alcohol having from 8–18 carbon atoms and a phenol or substituted phenol having from 2–20 carbon atoms.

9. The process as claimed in claim 7 in which the alkylene oxide-alcohol or phenol condensation product has from 3–30 alkylene oxide units.

10. The process as claimed in claim 7 in which the alkylene oxide-alcohol or phenol condensation product has from 4–16 alkylene oxide units.

11. The process as claimed in claim 4 in which the alkanolamide comprises the reaction product of a fatty acid having from 10–18 carbon atoms with an alkanolamide having from 2–4 carbon atoms.

12. The process as claimed in claim 11 in which the alkanolamine is selected from the group consisting of ethanolamine and diethanolamine.

References Cited

UNITED STATES PATENTS

| 2,861,963 | 11/1958 | Butsch | 260—2.5 |
| 3,016,576 | 1/1962 | Downing et al. | 260—2.5 |
| 3,202,307 | 8/1965 | Rainer et al. | 260—2.5 |

JOHN C. BLEUTGE, Primary Examiner

U.S. Cl. X.R.

260—23 XA, 30.8 R, 31.8 R, 31.8 W